(12) United States Patent
Carson

(10) Patent No.: US 7,004,094 B2
(45) Date of Patent: Feb. 28, 2006

(54) DRAG REDUCTION SYSTEM AND METHOD

(76) Inventor: Dale C. Carson, 528 Ocean Front, Jacksonville, FL (US) 32233

( * ) Notice: Subject to any disclaimer, the term of this patent is extended or adjusted under 35 U.S.C. 154(b) by 0 days.

(21) Appl. No.: 10/184,719

(22) Filed: Jun. 28, 2002

(65) Prior Publication Data

US 2004/0000265 A1    Jan. 1, 2004

(51) Int. Cl.
    B63B 1/38    (2006.01)
(52) U.S. Cl. .................................... 114/67 A
(58) Field of Classification Search ............. 114/67 R, 114/67 A; 244/130, 204, 207
    See application file for complete search history.

(56) References Cited

U.S. PATENT DOCUMENTS

| | | | | |
|---|---|---|---|---|
| 2,364,845 A | * | 12/1944 | Glen | 244/105 |
| 3,628,488 A | * | 12/1971 | Gibson | 114/67 A |
| 4,393,802 A | * | 7/1983 | Rizzo | 114/67 A |
| 4,788,928 A | * | 12/1988 | Tauber et al. | 114/255 |
| 4,932,612 A | | 6/1990 | Blackwelder et al. | |
| 4,987,844 A | | 1/1991 | Nadolink | |
| 5,054,412 A | | 10/1991 | Reed et al. | |
| 5,111,762 A | * | 5/1992 | Frangiamore | 114/222 |
| 5,263,667 A | | 11/1993 | Horstman | |
| 5,299,829 A | * | 4/1994 | Rivers et al. | 280/766.1 |
| 5,365,490 A | | 11/1994 | Katz | |
| 5,445,095 A | | 8/1995 | Reed et al. | |
| 5,456,201 A | * | 10/1995 | Bobst | 114/289 |
| 5,613,456 A | * | 3/1997 | Kuklinski | 114/67 A |
| 5,803,410 A | | 9/1998 | Hwang | |
| 5,908,217 A | | 6/1999 | Englar | |
| 5,987,818 A | * | 11/1999 | Dabideen | 49/280 |
| 6,092,480 A | | 7/2000 | Talahashi et al. | |
| 6,145,459 A | * | 11/2000 | Takahashi et al. | 114/67 A |
| 6,158,812 A | * | 12/2000 | Bonke | 297/391 |
| 6,293,881 B1 | * | 9/2001 | Ichida | 474/80 |
| 6,339,897 B1 | * | 1/2002 | Hayes et al. | 43/132.1 |
| 6,343,965 B1 | * | 2/2002 | Biggs et al. | 440/88 R |
| 6,356,816 B1 | | 3/2002 | Katz | |
| 6,357,464 B1 | | 3/2002 | Babenko | |
| 6,488,220 B1 | * | 12/2002 | Girlinger et al. | 239/585.1 |

* cited by examiner

Primary Examiner—Andrew D. Wright
(74) Attorney, Agent, or Firm—Mark J. Young

(57) ABSTRACT

A system for reducing skin friction drag includes a user-controlled drag reducing substance and components for introducing the substance at or near the surface of the object for which skin friction drag is desired. In a fluid injection system embodiment, a pressurized injectant source supplies an injectant, an injector device injects the injectant near the surface of the object for which drag reduction is desired, a hose or conduit directs flow of the pressurized fluid from the source to the injector device and a control device enables a user to control the flow.

4 Claims, 8 Drawing Sheets

DRAG REDUCTION SYSTEM AND METHOD

FIELD OF THE INVENTION

This invention relates generally to drag reduction and, more particularly, to a system and method for reducing skin friction drag in watercraft and recreational vehicles such as surfboards, windsurfers, personal watercraft and boats.

BACKGROUND

Introduction of a drag reducing substance near the affected surface of a moving object is known in the art. For example, injection of a fluid into the boundary layer of a fluid flow is known to substantially reduce skin friction drag for vehicles moving relative to the flow. The benefits of drag reduction are clear, including enhanced speed and acceleration, as well as fuel savings. In the case of surfing, reduced drag may translate into a substantially improved ability to propel a surfboard and catch a wave, as well as a longer and faster ride. In cases of water skiing and similar activities, reduced drag may mean greater maneuverability, less resistance to the pulling boat, higher top speeds and less stress on the skier's legs. In sum, the potential advantages of drag reduction abound for recreational vehicles. Yet, despite these benefits, heretofore, fluid injection systems have not been adapted specifically for such recreational use.

While fluid injection systems have been applied to large naval vessels, such as ships and submarines, as well as aircraft, such systems tend to be bulky, complex, costly and generally unsuitable for use with recreational vehicles. For example, some prior systems employ sophisticated processing systems to monitor fluid flow in or near the boundary layer and to control injection characteristics with precision. Some also require large power supplies and a complex network of tanks, pumps, controllers, independently controlled valves and individual nozzles to consistently achieve desired injection characteristics.

In general, prior systems are not tailored to provide a burst of injection for a relatively brief period of time. Rather, they contemplate substantially constant fluid injection for a relatively long duration. Consequently, such systems depend upon either large storage facilities to supply the fluid for injection or a system for harnessing ambient fluid as a supply source. The former typically requires massive storage tanks, and the latter typically requires bulky and expensive pumps or compressors.

Prior systems also do not address a means for user activation. In sharp contrast, they tend to be complex automated systems, taking the individual pilot or captain out of the loop. A recreational user may prefer to control the speed and acceleration benefits attributed to fluid injection.

Thus, a fluid injection drag reduction system that is light-weight, compact, easy to use and maintain, affordable and controllable by the user is needed for recreational vehicles.

SUMMARY

It is therefore another object of the present invention to provide a system for effectively introducing a drag reducing substance, said system being relatively simple to manufacture, apply and maintain.

It is therefore another object of the present invention to provide a fluid injection system that is relatively simple to manufacture and maintain.

It is another object of the present invention to provide a fluid injection system that can be manufactured at relatively low cost.

It is also another object of the invention to provide a fluid injection system that is compact and suitable for adaptation to various recreational vehicles, including surfboards, windsurfers, personal watercraft, and recreational boats.

It is yet another object of the invention to provide an injection system that enables user activation.

It is a further object of the invention to provide an injection system that provides short user-controllable bursts of injected fluid to conserve injectant and enable drag reduction as desired.

It is yet a further object of the invention to provide an injection system that includes an injectant supply that may be replenished using commercially available goods and services.

It is yet another object of the invention to provide a fluid injection system that may be sold as a kit and adapted for use with various vehicles and crafts.

To achieve these and other objects, an drag reduction system in accordance with an exemplary embodiment of the present invention includes a drag reducing substance supply and user-controllable means for introducing the drag reducing substance near the surface of an object to reduce drag.

BRIEF DESCRIPTION OF THE DRAWINGS

The foregoing and other objects, features and advantages of the present invention will become better understood with reference to the following description, appended claims, and accompanying drawings, where:

DETAILED DESCRIPTION

A drag reduction system in accordance with an exemplary embodiment of the present invention generally includes a user-controllable means for introducing a drag reducing substance at or near the surface of a moving object for which drag reduction is desired. In an injection system implementation in accordance with an exemplary embodiment of the present invention, the system generally includes a pressurized injectant source, an injector means for injecting the injectant near the surface of the object for which drag reduction is desired, means for directing flow of the pressurized fluid from the source to the injector means and control means for a user to control the flow. While an injection system in accordance with the present invention may be applied to any vehicles for which skin friction drag reduction is desired, it is particularly well suited for recreational water vehicles such as surfboards, wind surfers, personal watercraft and recreational boats. It may also be applied to recreational land vehicles such as skis, sleds, motor vehicles and the like. It may even be applied to individuals, such as by integration with a suit or helmet to reduce skin friction drag in competitive and recreational skiing, sledding and luge competitions where a fraction of a second can make the difference between victory and defeat.

Figure 1:
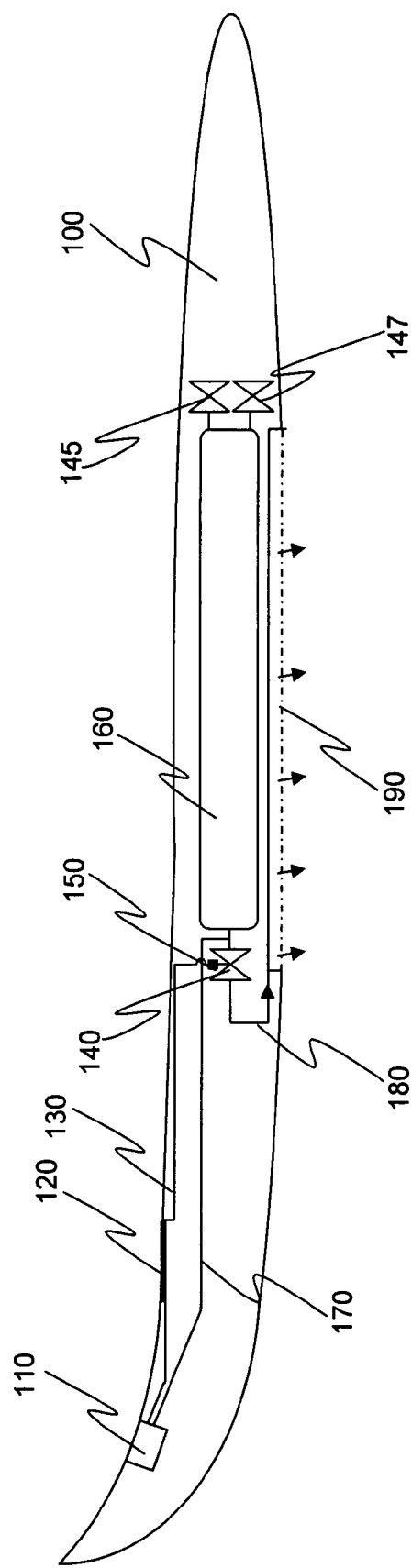
FIG. 1 conceptually depicts a cross-sectional side view of a surfboard equipped with an exemplary drag reduction system in accordance with a preferred implementation of the present invention.
Figure 2:
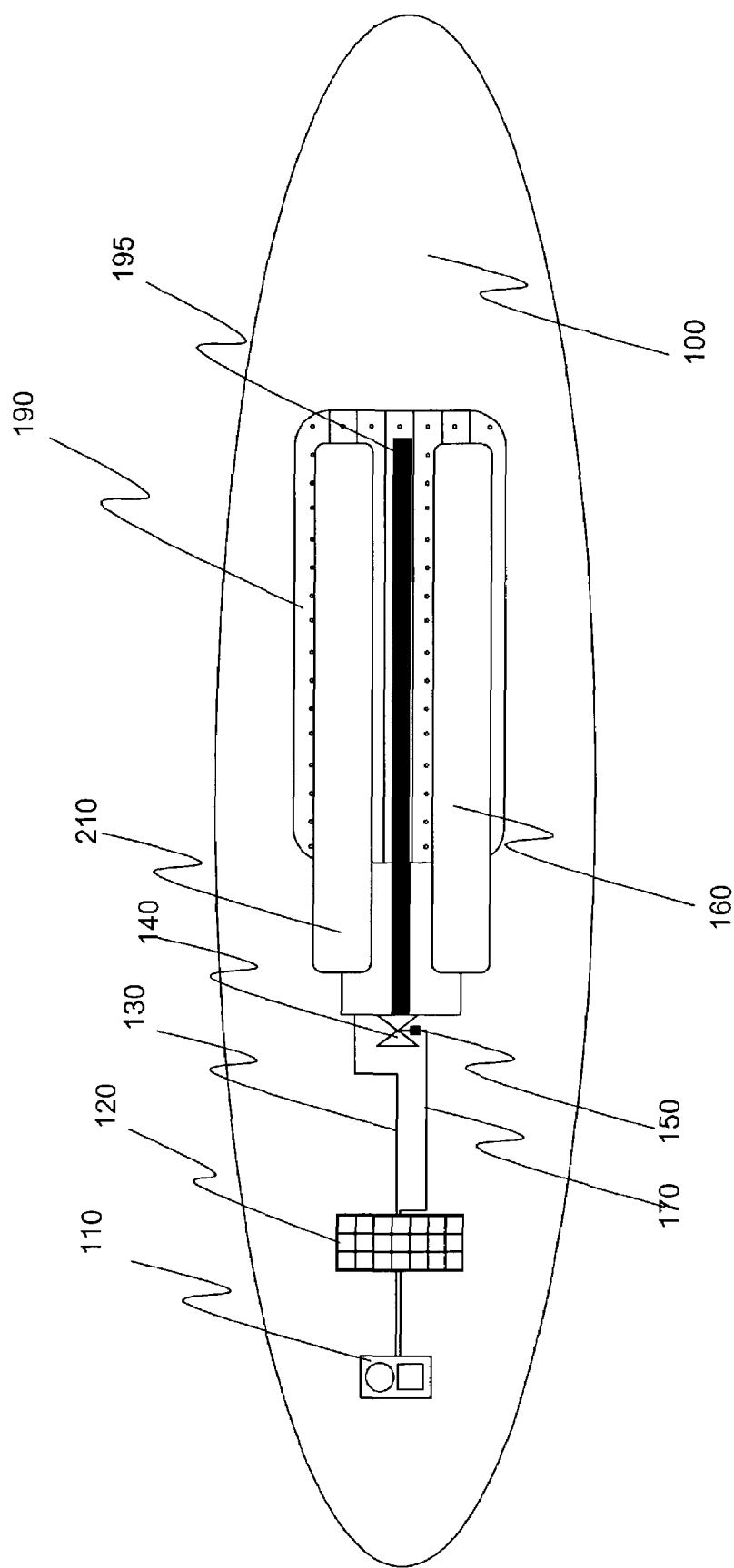
FIG. 2 conceptually depicts a cross-sectional top view of a surfboard equipped with an exemplary drag reduction system in accordance with a preferred implementation of the present invention.
Figure 3:
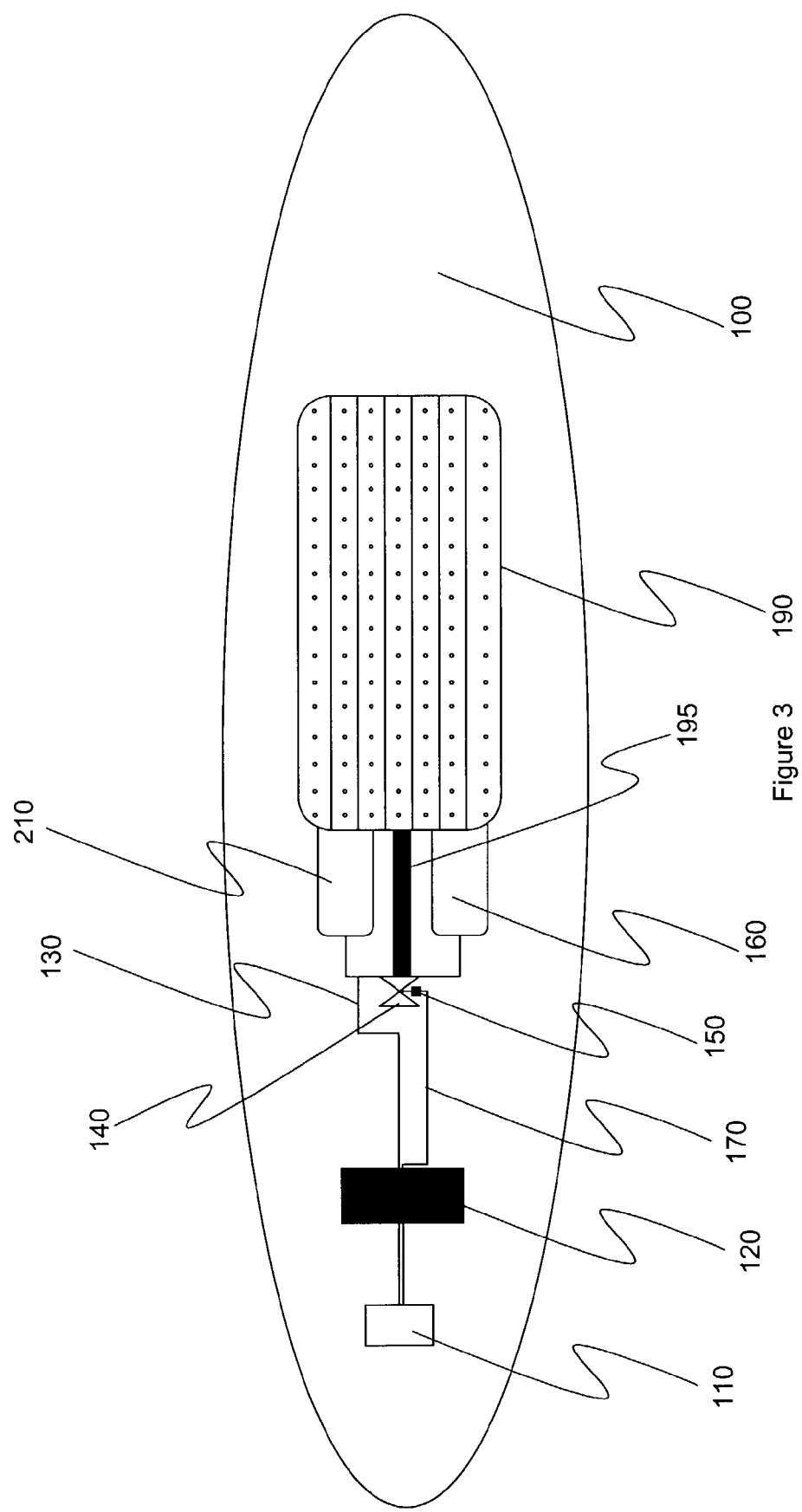
FIG. 3 conceptually depicts a cross-sectional bottom view of a surfboard equipped with an exemplary drag reduction system in accordance with a preferred implementation of the present invention.

Referring now to FIG. 1, a cross-sectional side view of a surfboard 100 equipped with an exemplary drag reduction system 110–190 in accordance with a preferred implementation of the present invention is conceptually illustrated. FIGS. 2 and 3 provide top and bottom views of such a surfboard, with elements having the same numbers being the same or substantially similar elements.

A pressurized injectant source supplies injectant for drag reduction. The source may include a pressurized container of an injectant fluid, an injectant fluid supply and a pumping means, or a reaction vessel for generating an injectant from a controlled chemical reaction. For example, as conceptually shown in FIGS. 1–3, the injectant source may include a tank containing a pressurized fluid injectant 160 and 165. In a preferred implementation, the tank may include a valve 147, such as a schrader valve (i.e., a standard automotive style air valve), and be able to contain a volume of compressed air. Thus, it can easily be refilled such as by an ordinary motorized air compressor, a manual pump or a tank of pressurized air. Of course, other valve mechanisms and compressed fluids may be used instead of (or in addition to) those discussed above without departing from the scope of the present invention.

Where tanks are utilized, the pressurized injectant source may include one or more pressure relief valves, such as 145. The pressure relief valve 145 controls the maximum pressure level of the fluid in the tank 160, preventing overfilling, possible structural failure and injury to a user. The maximum pressure should be sufficient to allow approximately maximum filling of the tank without appreciably risking structural failure of the tank and its components. In addition to preventing overfilling, the pressure relief valve may prevent excessive pressure caused by thermal expansion of fluid within a tank. When the pressure exceed the maximum fluid escapes through the pressure relief valve. When enough fluid has escaped so that the pressure reaches the maximum allowable pressure, the pressure relief valve closes.

In an alternative implementation, the pressurized injectant source may be comprised of a motor-driven pump or compressor and an injectant fluid supply. The injectant fluid supply may be ambient air or water. Thus, for example, a pump may supply pressurized ambient air or water as a fluid injectant. For applications requiring a light weight, low-cost compact solution, this implementation is generally disfavored, but still comes within the scope of the present invention.

In yet another alternative implementation, the pressurized injectant source may be comprised of a scoop for capturing and redirecting ambient fluid such as water or air. A scoop may be particularly well suited for high speed craft such as boats and personal watercraft.

An injector means directs injectant into a region (e.g., a boundary layer region) near the surface of the object for which skin friction drag reduction is desired. Referring to FIG. 1, the rectangular region 190 conceptually represents a plenum having a perforated or porous bottom surface serves as an injector means. Of course, other injector means such as valves connected to a hull or openings (e.g., holes) in a hull come within the scope of the present invention. The plenum 190 provides a chamber for receiving the injectant. A surface (as shown, the bottom surface) of the plenum includes openings to allow injectant to escape. Though the plenum 190 is illustrated as a rectangular apparatus, it can be a variety of shapes and sizes. It can also be integrated with the hull design, using one or more surfaces of a hull to form the plenum.

Preferably, the injector means is positioned to allow injectant to escape into a region near a surface of the object experiencing appreciable skin friction drag. Thus, for example, as illustrated in FIG. 1 by downward slanted arrows, the injectant may escape into a region that is adjacent to a bottom submerged portion of the surfboard 100. This portion is considered to be susceptible to substantial skin friction drag brought about by the motion of the surfboard relative to the water.

The injector means, such as the plenum 190, may be comprised of materials and manufacturing techniques known in the art. For example, the plenum may be comprised of a plastic known in the art, such as plastics based on polyethylene, polypropylene, polystyrene, polyvinylchloride, acrylics, cellulosics, acrylonitrile-butadiene-styrene terpolymers (ABS), acetal resins, polyamides, polycarbonates and polyesters. In such a case, it may be produced using plastic manufacturing techniques known in the art, such as injection, compression, structural foam, blow, or transfer molding; polyurethane foam processing techniques; and casting. Alternatively, the injector means may be comprised of a metal, which may be coated or otherwise treated for corrosion resistance. Though various materials may be used, preferably the material is corrosion resistant, strong, light weight, durable, relatively inexpensive and capable of producing an aesthetically pleasing part. Reinforcing members such as ribs and trusses may be included in the plenum to enhance its strength.

Figure 4:
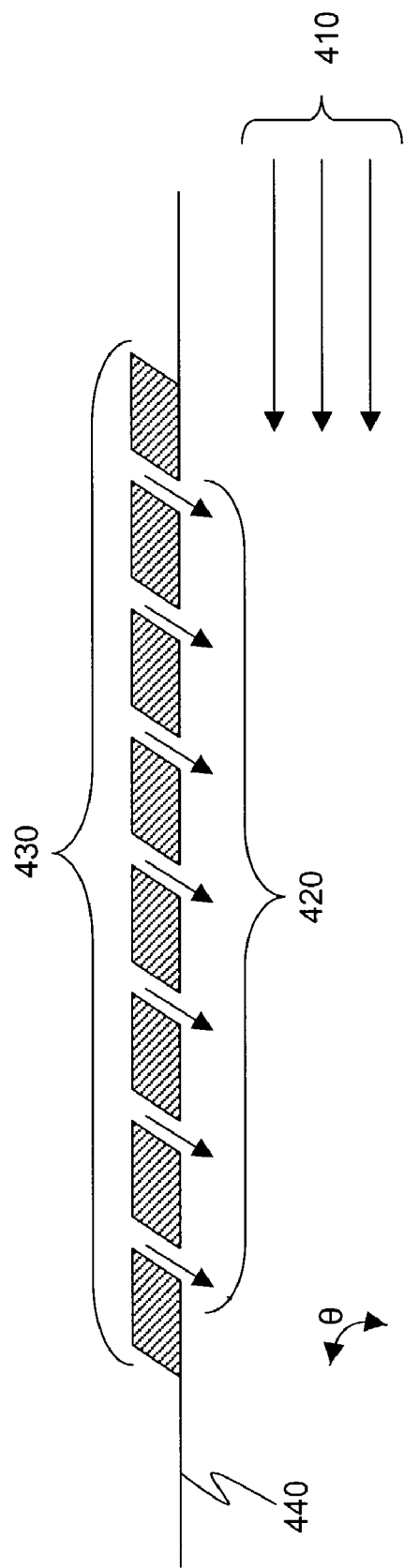
FIG. 4 conceptually depicts a cross-sectional side view of the bottom surface of an exemplary plenum having angled holes in accordance with a preferred implementation of the present invention.

In a preferred implementation of the present invention, the injector means, such as the plenum 190, enables injectant to be injected outwardly from the surface and angled in direction of the flow. Referring to FIG. 4, the direction of flow relative to the surface 440 is shown by arrows 410. Injector means 430 (such as a plenum with a perforated surface as described above) introduces injectant (indicated by short arrows) 420 outwardly from the surface 440 and angled in direction of the flow 410 relative to the surface 440. Various angles may be used depending upon the flow velocity, and pressure of the injectant, the type of fluid flow (e.g., water or air) and the type of injectant. Such an angle is believed to facilitate injection and possibly enhance the drag reducing effects of the injectant by keeping the injectant closer to the surface. In an exemplary implementation, an angle θ of less than 90° relative to the surface (as depicted in FIG. 4) may be used.

Figure 5:
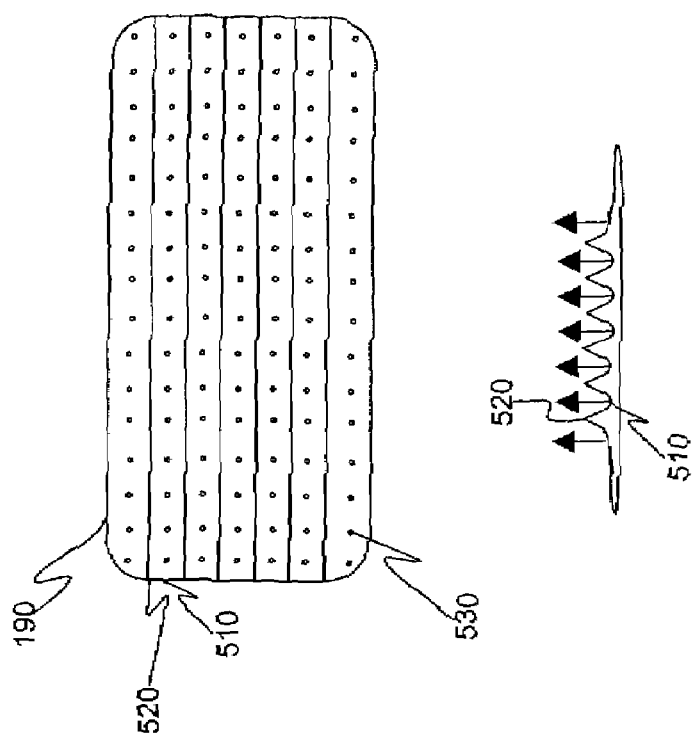
FIG. 5 conceptually depicts a bottom view of an exemplary plenum having fluted regions or riblets in accordance with a preferred implementation of the present invention.

In an exemplary implementation of a plenum in accordance with the present invention, grooves, riblets 520, channels or fluting, as conceptually shown as 510 in FIG. 5, may be included. It is believed that the fluting walls slow fluid flow in the fluted region and thereby reduce the rate of injectant diffusion out of the boundary layer. The number, shape and dimensions of such grooves, riblets, channels or fluting, may vary depending upon the size and speed of the vehicle or craft, and the rate of injection. An objective is to achieve greater reduction of skin friction drag than attainable with a conventional surface. Thus, preferably, the number, shape and dimensions of the grooves, riblets, channels or fluting, do not compromise or negate the drag reduction benefits achieved through fluid injection. Rather, the grooves, riblets, channels or fluting, should enhance the overall drag reduction benefits achieved through fluid injection.

A means (e.g., 180) for directing the injectant flow from the pressurized injectant source, such as the tank 160, to the injector means, such as plenum 190, contains and guides injectant. The means 180 may be comprised of conventional hoses, conduit, pipes and other fluid delivery means known in the art. Preferably the means 180 is comprised of a material that is corrosion resistant, relatively strong, light weight, durable, relatively inexpensive and capable of withstanding pressures exerted by the injectant. For example, stainless steel tubes or flexible rubber or plastic hoses may be used. To enhance strength and durability, a braided sheath may be provided.

Attachment means are also preferably provided to fluidly connect the means 180 for directing injectant flow to the pressurized injectant source and to the injector means. The attachment means may include mating male and female couplings and fittings, such as threaded hose couplings or pneumatic quick couplings, as are well known in the art.

A control means enables a user to control the flow of fluid from the pressurized injectant source, through the means 180 for directing the injectant flow and to the injector means. The control means may be comprised of a mechanically activated (i.e., opened and closed) valve with user accessible means to activate the valve. Such user accessible means may include a lever, switch, button, handle or knob that when flipped, pulled, pressed or turned activates the valve. Alternatively, an electrically activated valve, such as piezoelectric or conventional solenoid controlled valve 140, opening and/or closing in response to electrical signals from a controller 150, may be used. The controller 150 may produce a signal for activating the valve upon either activation of a user-accessible switch or receipt of a digital code from a short range radio transmitter, such as a handheld device similar to a key fob for an automotive keyless entry system. Such a controller 150 includes circuitry to monitor a radio frequency and produce the requisite signal when it receives the correct digital code from the radio transmitter. Those skilled in the art will appreciate that analogous devices used for keyless locking and unlocking of automotive doors and trunks can readily be adapted to open and close various valves.

When opened, the control means from the pressurized injectant source, through the means 180 for directing the injectant flow and to the injector means. Preferably, one control means controls the flow, even if multiple pressurized injectant sources, such as tanks 160 and 210, are utilized. Multiple control means will result in increased cost, size, complexity and weight. To utilize a single control means with a plurality of tanks, separate hoses from the tanks may be fluidly coupled with a T-fitting, manifold or the like, with a single hose leading from the fluid coupling to the control means.

An electrical power supply provides power required by any electrical components such as solenoid valves, piezoelectric valves, sensors, displays, controllers and the like. The power supply may be comprised of batteries, disposable or rechargeable, and/or photovoltaic cells, such as 120 in FIGS. 1 through 3.

Conventional electric transmission means, such as a wiring circuit or harness 130, transmits available electric current from the electric power supply to components as needed. The electric transmission means is preferably insulated, corrosion resistant, durable, light weight and inexpensive.

A user may operate an injection system in accordance with the present invention in various modes. In a burst mode, injection may be enabled for short durations as determined by the user. For example, upon activation, the control means may enable injection for only a determined period of time (e.g., 5 or 10 seconds). Thus, injectant can be conserved and used sparingly at moments when the user most desires drag reduction, such as for a surfer to catch a wave. Other modes include a steady state mode, enabling steady and continues injection until the injectant supply is exhausted, and a variable mode, enabling injection according to operating conditions. For example, in variable mode the amount of injection may depend upon the duration the user activates the control means or the speed of the craft.

Sensors may also be utilized in an exemplary implementation of the present invention. Mechanical and electrical sensors may provide measurements or generate signals representative of various ambient and internal conditions. For example, pressure and/or temperature sensors may be included in fluid delivery means 180, plenum 190 or tank 160 to generate signals representative of the pressure and/or temperature conditions therein. Similarly, temperature and pressure sensors and a velocimeter may be positioned along the surface of the surfboard 100 to generate signals representative of ambient temperature, pressure and speed.

Displays may also be provided in an exemplary implementation of the present invention. The displays may provide analog, digital or graphical output of sensor measurements and data. For example, an LCD or LED display 110 may provide a digital or graphical pressure measurement. Alternatively, activating the control means to enable fluid to flow from the pressurized injectant source, through the means 180 for directing the injectant flow and to the injector means, may cause a pressure sensor to generate a signal that causes a light such as a conventional bulb or LED to illuminate. Of course, the sensors and displays are preferably waterproof, corrosion resistant, durable, light weight and inexpensive.

Figure 6:
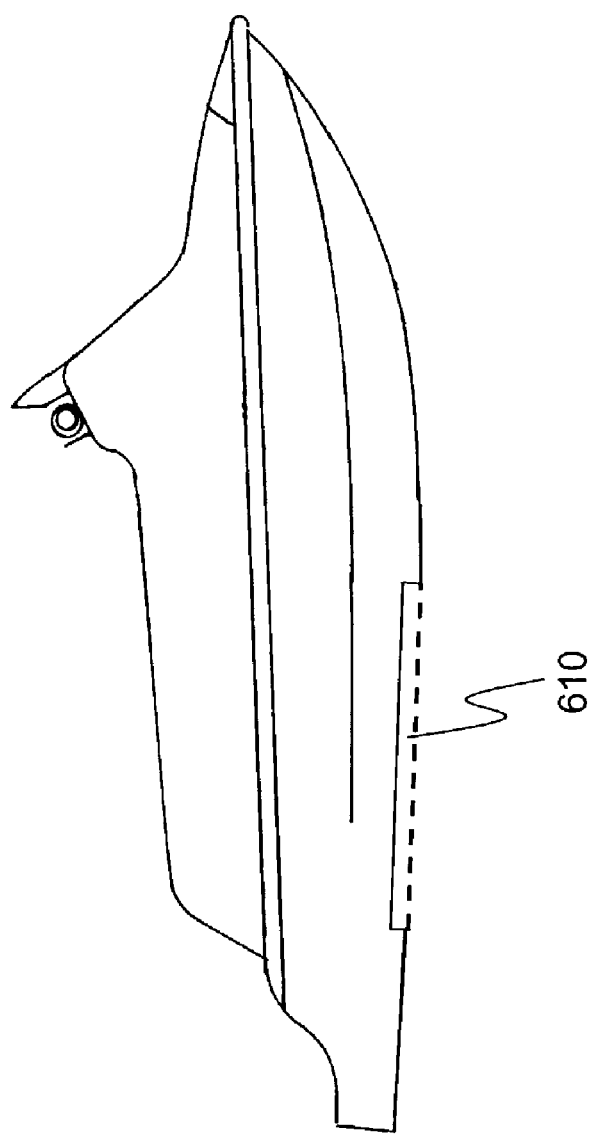
FIG. 6 conceptually depicts a side view of a personal watercraft equipped with an exemplary drag reduction system in accordance with a preferred implementation of the present invention.
Figure 7:
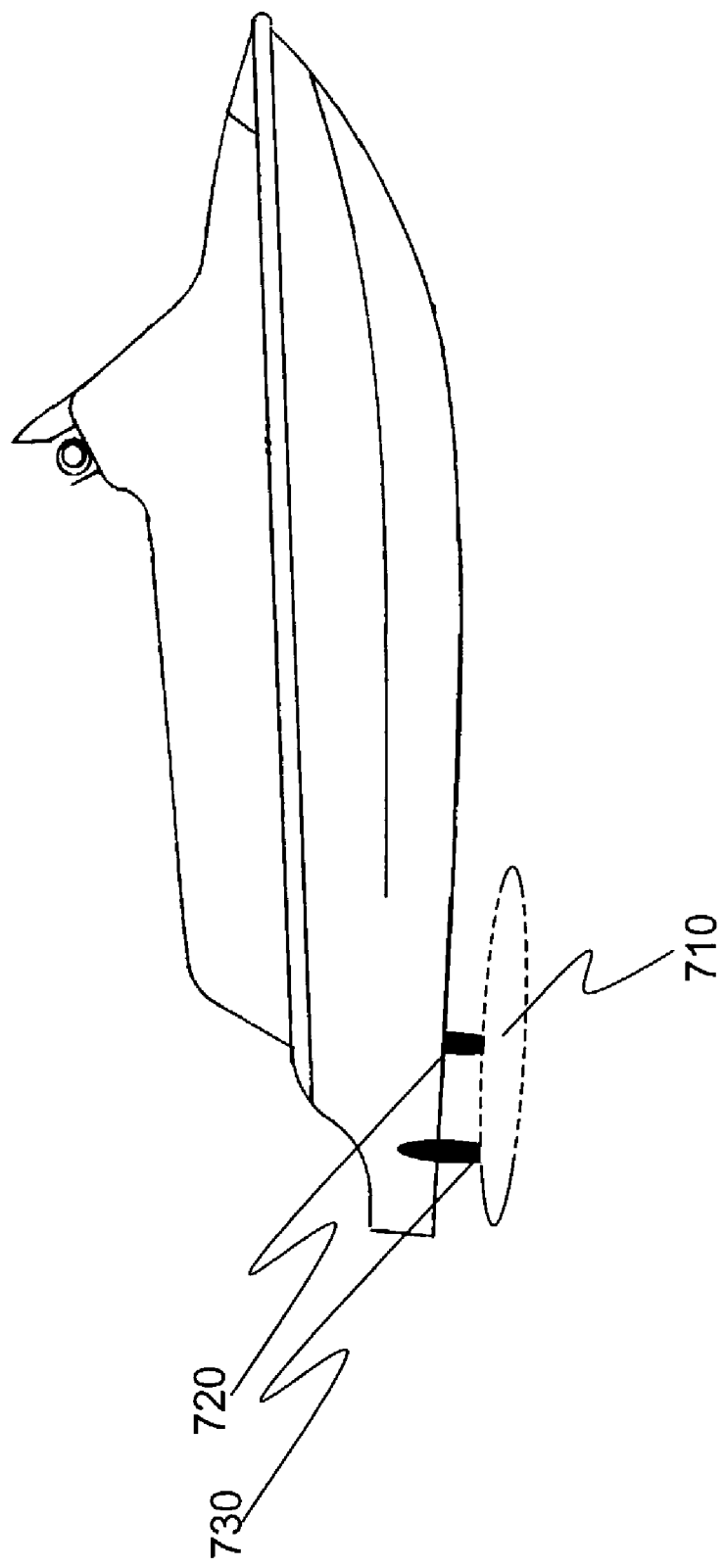
FIG. 7 conceptually depicts a side view of a personal watercraft equipped with a hydrofoil that utilizes an exemplary drag reduction system in accordance with a preferred implementation of the present invention.

Referring now to FIGS. 6 and 7, a drag reduction system in accordance with an exemplary embodiment of the present invention may be applied to vehicles other than surfboards, such as a personal watercraft. In the case of a personal watercraft, the existing engine may power a pump or compressor to supply pressurized water or air as the injectant. Pressurized air may be stored in a tank, such as 160, or directly sent to the injector means, such as plenum 610, for injection.

The control means for enabling a user to control the flow of fluid to the injector means 610 of a personal watercraft, may either be integrated with existing equipment controls, such as the throttle, or added as a new device. For example, in addition to controlling fuel consumption and engine speed, the throttle may also activate injection and/or control the rate of injection. Alternatively, a switch may be conveniently located for the driver to initiate injection.

In an alternative embodiment, a hydrofoil, such as 710 in FIG. 7, may be provided. One or more adjustable or static struts 720 and 730 position and support the hydrofoil. While the hydrofoil 710 may help generate desired hydrodynamic forces, it may also be designed to function as an injector means 710. Thus, use of the hydrofoil 710 as an injector means reduces the additional drag caused by the hydrofoil. Such use of the hydrofoil as an injector means may be in addition to use of the injector means 610 as in FIG. 6.

Figure 8:
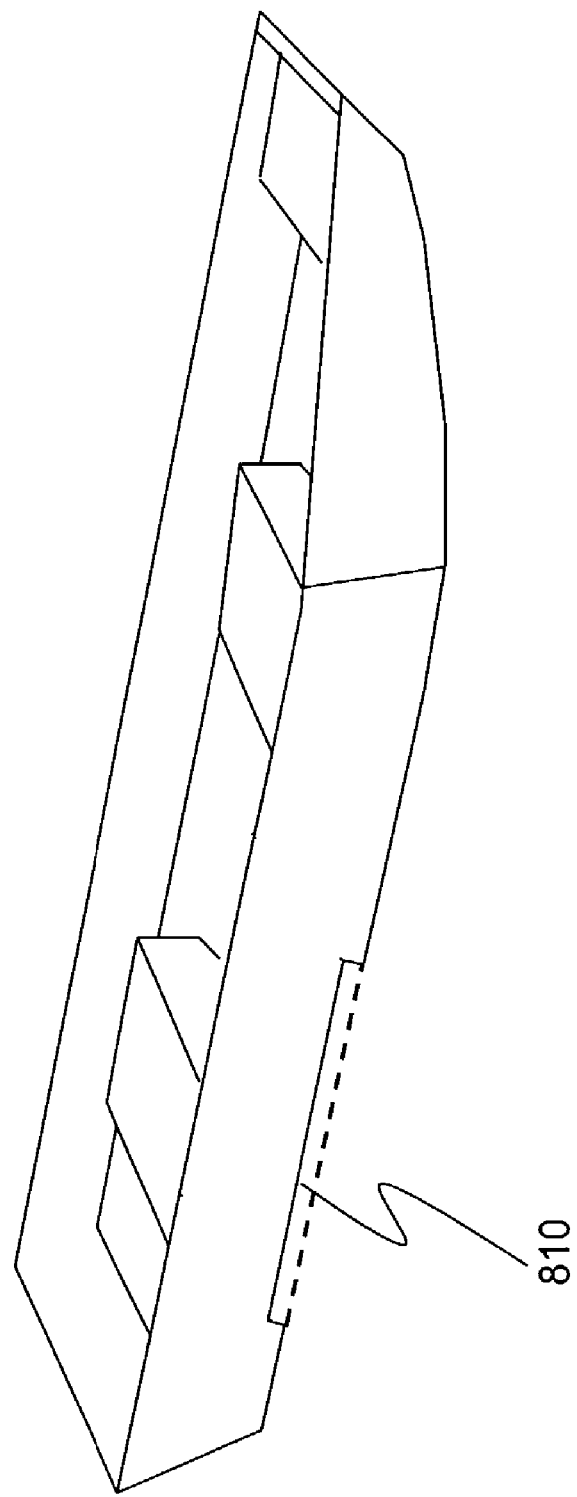
FIG. 8 conceptually depicts a side view of a jon boat equipped with an exemplary drag reduction system in accordance with a preferred implementation of the present invention.

Referring now to FIG. 8, a drag reduction system in accordance with an exemplary embodiment of the present invention may be applied to boats. In the case of a motorized boat, the existing engine may power a pump or compressor to supply pressurized water or air as the injectant. In addition, or as an alternative, pressurized air may be stored in a tank, such as 160. The injectant is directed to the injector means, such as plenum 810, for injection.

The control means for enabling a user to control the flow of fluid to the injector means 810 of a boat, may either be integrated with existing equipment controls, such as the throttle control for the boat, or added as a new device. For example, in addition to controlling fuel consumption and engine speed, the throttle may also control the initiation and/or rate of injection. Alternatively, a switch, remote controller or mechanical valve may be provided to initiate injection.

In an alternative implementation of the present invention, a drag reducing additive is introduced into a soft abradable matrix, such as wax or resin. The matrix with the additive may be applied to the surface of an object for which drag reduction is desired. For example, the matrix may include a conventional paraffin wax comprised principally of alkanes or a conventional synthetic wax such as a low molecular weight polyethylene having wax-like properties. Preferably, the matrix is formulated or modified to abrade in a determined fashion during the course of use. The drag reducing additive may be comprised of a powder or microspheres of polytetrafluoroethylene (PTFE, e.g., TEFLON®) or graphite. As friction caused by the surface of the object moving against another surface such as snow, ice or water abrades the matrix, the drag reducing additive is controllably released. The concentration of the drag reducing additive may be varied according to the specific application. Thus, unlike conventional wax coatings for skis which are designed to adhere to the ski and resist abrasion, and be applied infrequently, a matrix in accordance with the present invention is soft and tailored to abrade and release drag reducing particles to reduced skin friction drag.

Those skilled in the art will appreciate that conventional tanks, valves, hoses and connectors used in connection with scuba diving and other compressed air applications may be utilized. Such tanks, valves, hoses and connectors and are intended to come within the scope of the present invention.

All substantially equivalent elements, components and relationships to those conceptually illustrated in the drawings and/or described in the specification are intended to be encompassed by the present invention. The referenced drawings and foregoing detailed description are considered as illustrative only of exemplary embodiments of the present invention. As numerous modifications and changes may readily occur to those skilled in the art, the foregoing description is not intended to limit the invention to the exact construction, configuration and operation shown and described. Accordingly, for example, without limitation, variations in size, materials, shape, position, form and assembly that are readily apparent clearly fall within the scope of the invention.

What is claimed is:

1. A system for reducing skin friction drag on a surface of a moving object, said system being comprised of a drag reducing substance that comprises a pressurized injectant and a user-controllable means for introducing the drag reducing substance at or near the surface
    wherein said user-controllable means for introducing the drag reducing substance includes a source of the pressurized injectant, an injector means for injecting the injectant at or near the surface, means for directing flow of the pressurized injectant from the source to the injector means, and control means for a user to control the flow, and
    wherein the source of a pressurized injectant is comprised of a tank for containing pressurized injectant and at least one valve for controlling a flow of injectant into and out of the tank, and
    wherein the user-controllable means for introducing the drag reducing substance includes means for causing flow in at least one of the modes from the group consisting of burst mode, steady state mode and variable mode, and
    wherein the at least one valve includes a schrader valve.

2. A system as in claim 1, wherein the injectant is comprised of air and the schrader valve provides means for receiving air from a conventional air compressor.

3. A system as in claim 2, wherein the user-controllable means for introducing the drag reducing substance is further comprised of at least one solenoid valve and a user accessible means for activating said solenoid valve, and wherein the user accessible means for activating said solenoid valve includes a portable radio transmitter for transmitting a valve activation signal and a receiver for receiving said activation signal and generating a signal for activating said solenoid valve based on the received activation signal.

4. A system as in claim 2, wherein the user-controllable means for introducing the drag reducing substance is comprised of at least one piezoelectric valve and a user accessible means for activating said piezoelectric valve, and wherein the user accessible means for activating said piezoelectric valve includes a portable radio transmitter for transmitting a valve activation signal and a receiver for receiving said activation signal and generating a signal for activating said piezoelectric valve based on the received activation signal.

* * * * *